No. 694,852. Patented Mar. 4, 1902.
M. B. GOOING.
PLANTER.
(Application filed Apr. 24, 1901.)
(No Model.)
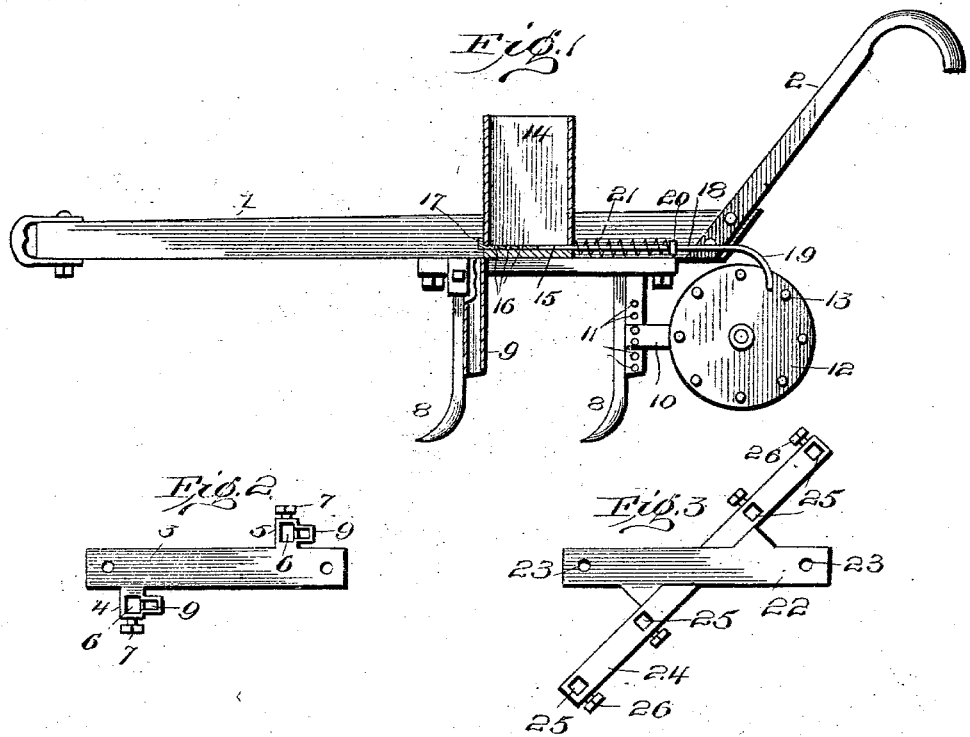

UNITED STATES PATENT OFFICE.

MARTIN BIRD GOOING, OF MINDEN, LOUISIANA.

PLANTER.

SPECIFICATION forming part of Letters Patent No. 694,852, dated March 4, 1902.

Application filed April 24, 1901. Serial No. 57,179. (No model.)

*To all whom it may concern:*

Be it known that I, MARTIN BIRD GOOING, a citizen of the United States, residing in Minden, parish of Webster, and State of Louisiana, have invented certain new and useful Improvements in Planters, of which the following is a full, clear, and exact description, reference being had to the accompanying drawings, forming part of this specification.

My invention relates to certain improvements in a combined planter and cultivator.

The object of my invention is to produce an implement of this character that is cheap of manufacture, simple, and effective; and with these and minor objects my invention consists of parts and combination of parts as will be hereinafter more fully set out.

In the drawings, Figure 1 is a side elevation of a plow-beam with my improved planter attached, some of the parts being in section. Fig. 2 is a top plan view of the plate for attaching the planter to the plow-beam. Fig. 3 is a top plan view of means for securing cultivator-teeth or furrow opening and covering plows to the beam.

1 represents the ordinary plow-beam; 2, the guiding-handles thereof.

3 is a plate having integral laterally-extending lugs 4 and 5, through which is formed a rectangular opening 6.

7 is a set-screw secured in a threaded opening in the lugs 4 and 5 and adapted to project into the opening 6 in said lugs, by means of which the standard and plow-points 8 are secured in said opening 6 of the plate 3.

9 is a hollow strengthening-rib and seed-conductor, formed immediately back of the opening 6 and extending a suitable distance below the plate 3 to form a strengthening rib or brace for the plow-points 8. These strengthening-ribs 9 are hollow, as clearly shown in Fig. 1, whereby they are adapted when desired to guide grain in the furrow immediately back of the forward plow-point 8.

10 is a hanger, adjustably secured by bolts to the strengthening-rib immediately back of the rear plow-point 8. This rib is provided with a series of bolt-openings 11, whereby the brace or hanger 10 may be adjusted to the desired position vertically.

12 is a disk journaled to the brace or hanger 10 and provided with studs 13, projecting from one side thereof near its periphery. The depth of the furrow may be regulated by adjusting this roller or disk vertically.

14 is a seedbox, suitably secured to the plow-beam, and 15 is a seed-slide therefor, provided with suitable apertures 16, the forward end of the seed-slide being turned upwardly, as at 17.

18 is an arm extending rearwardly from the seed-slide 15 and bent downwardly, as at 19, at its rear end, whereby said rear end projects within the path of the studs or projections 13 on the disk 12.

20 is a stop firmly secured to the rearwardly-extending end 18, and 21 is a coil-spring secured around the end 18 between the lug 20 and the seedbox 14.

As the disk 12 revolves in the operation of the device the lugs or projections 13 strike a downwardly-bent end 19, thereby pushing the seed-slide 15 forwardly, whereupon the seed in the box 14 is by means of the perforations 16 in the seed-slide fed into the forward hollow brace or rib 9, by which the seeds are deposited in the furrow back of the forward plow-point, and in the continued operations of the machine the rear plow-point throws the soil into the furrow immediately rearward of the first plow-point, thereby covering the seed. As soon as the downwardly-extending end 19 has passed beyond the lug or projection 13 the spring 21 immediately retracts the seed-slide 15. This operation is continued as described.

In Fig. 3 I have shown means for securing a series of cultivator-teeth to the plow-beam, consisting of the plate 22, having suitable openings 23, by means of which said plate is secured to the beam, and 24 is a bar suitably secured to said plate 23, provided with opening 25, in which the ends of the cultivator-teeth are secured by means of the set-screws 26. This construction is to be only used when the machine is converted into a cultivator.

What I claim, and desire to secure by Letters Patent, is—

1. The combination with a plow-beam, of a plate having suitable perforated lugs in which plow-standards carrying points are secured, hollow strengthening-ribs depending from said plate back of said lugs, a disk adjustably secured to one side of the strengthening-ribs, lugs or projections on the face of said disk, of a seedbox having a perforated seed-slide, a rearward extension secured to said seed-slide and extended in the path of the lugs on the face of said disk, and means for holding the seed-slide normally within the seedbox.

2. The combination with a plow-beam, of a plate having suitable perforations in which plow-standards carrying points are secured, a disk adjustably secured to one side of the plow-points, lugs or projections on the face of said disk, of a seedbox having a perforated seed-slide, a rearward extension secured to said slide and extended in the path of the lugs on the face of said disk, and means for holding the seed-slide normally within the seedbox.

MARTIN BIRD GOOING.

Witnesses:
J. A. COLBERT,
J. W. MORGAN.